(12) United States Patent
He et al.

(10) Patent No.: US 11,494,008 B2
(45) Date of Patent: Nov. 8, 2022

(54) MOUSE PAD

(71) Applicants: Moft Inc., Rowland Heights, CA (US); Ben-Tien Lin, New Taipei (TW)

(72) Inventors: Jia-Jia He, Rowland Heights, CA (US); Ben-Tien Lin, New Taipei (TW)

(73) Assignees: Ben-Tien Lin, New Taipei (TW); Moft Inc., Rowland Heights, CA (US)

( * ) Notice: Subject to any disclaimer, the term of this patent is extended or adjusted under 35 U.S.C. 154(b) by 212 days.

(21) Appl. No.: 16/872,342

(22) Filed: May 11, 2020

(65) Prior Publication Data
US 2021/0208702 A1 Jul. 8, 2021

(30) Foreign Application Priority Data

Jan. 3, 2020 (CN) .......................... 202020016342.3

(51) Int. Cl.
*G06F 3/039* (2013.01)
*H04M 1/04* (2006.01)

(52) U.S. Cl.
CPC ............ *G06F 3/0395* (2013.01); *G06F 3/039* (2013.01); *H04M 1/04* (2013.01)

(58) Field of Classification Search
None
See application file for complete search history.

(56) References Cited

U.S. PATENT DOCUMENTS

| | | | |
|---|---|---|---|
| 10,855,821 B1* | 12/2020 | Chou | G06F 1/1681 |
| 2007/0210172 A1* | 9/2007 | Moon | H04M 1/04 |
| | | | 235/486 |
| 2008/0124509 A1* | 5/2008 | Boise | G06F 3/0395 |
| | | | 428/45 |
| 2011/0266194 A1* | 11/2011 | Bau | H04M 1/04 |
| | | | 206/736 |
| 2017/0223161 A1* | 8/2017 | Lau | F16M 11/10 |

* cited by examiner

*Primary Examiner* — Xuyang Xia
(74) *Attorney, Agent, or Firm* — Rosenberg, Klein & Lee

(57) ABSTRACT

A mouse pad includes a mouse pad body and a mobile device support area, and the mobile device support area is flatly extended from a side of the mouse pad body and can be turned clockwise, so that the mobile device support area sticks out in a direction towards the top of the mouse pad body to form a mobile device support stand. Users can use the mouse pad or the transformed mobile device support stand alone or use the mouse pad body for the operation of a mouse while using the transformed mobile device support stand to achieve the effect of watching a mobile device.

7 Claims, 10 Drawing Sheets

MOUSE PAD

BACKGROUND OF INVENTION

Field of Invention

The present invention relates to a mouse pad, in particular to a mouse pad having a mobile device support stand.

Description of the Related Art

In our daily life, a mouse pad has become a basic tool for everyone. However, modern people are usually busy at work and their mobile devices such as mobile phones or tablet PCs at hand need to be used for viewing immediately, but they often do not know where the mobile device should be placed, so that the mobile devices are placed anywhere. As a result, it is very easy for them to drop and damage the mobile phones or tablet PCs, and this problem causes tremendous inconvenience and trouble to users.

Therefore, it is an important subject for related manufacturers to provide a structure for supporting a mobile device on a general mouse pad, so that the mobile phone or table PC at hand can be placed on the mouse pad while a user is using a mouse on the mouse pad.

SUMMARY OF THE INVENTION

In view of the aforementioned drawbacks of the prior art, it is a primary objective of the invention to provide a mouse pad comprising a mouse pad body and a mobile device support area, and the mobile device support area can be turned to stick out the mobile device support area to form a mobile device support stand, so that users can use the mouse pad transformed into the mobile device support stand to watch a mobile device.

To achieve the aforementioned and other objectives, the present invention discloses a mouse pad comprising a mouse pad body and a mobile device support area, wherein the mobile device support area is flatly extended from a side of the mouse pad body, and the mobile device support area can be turned clockwise to stick out the mobile device support area in a direction towards the top of the mouse pad body to form a mobile device support stand, so that users can use the mouse pad or the transformed mobile device support stand, or both (such as using a mouse on the mouse pad body while using the transformed mobile device support stand to watch a mobile device).

BRIEF DESCRIPTION OF NUMERALS USED IN THE DRAWINGS

1: Mouse pad; 2: Mouse pad body; 3: Mobile device supporting area; 4: Wrist rest portion; 31: Flip plate; 32: Bonded plate; 33: Plate member; 341: First longitudinal bent portion; 342: Second longitudinal bent portion; 343: Third longitudinal bent portion; and 344: Fourth longitudinal bent portion.

DESCRIPTION OF THE PREFERRED EMBODIMENTS

Figure 1:
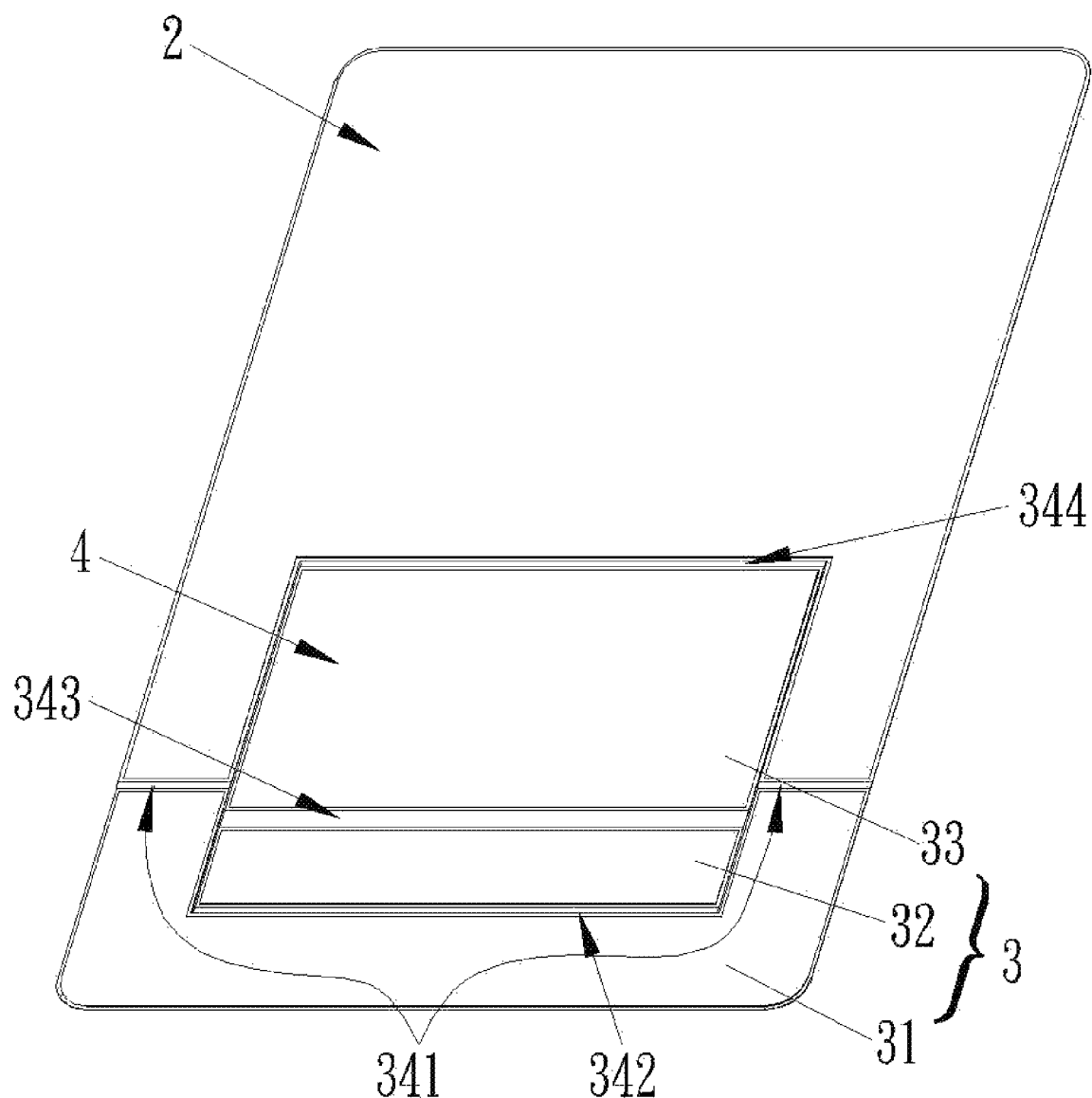
FIG. 1 is a perspective view of a mouse pad in accordance with a first embodiment of the present invention.
Figure 2:
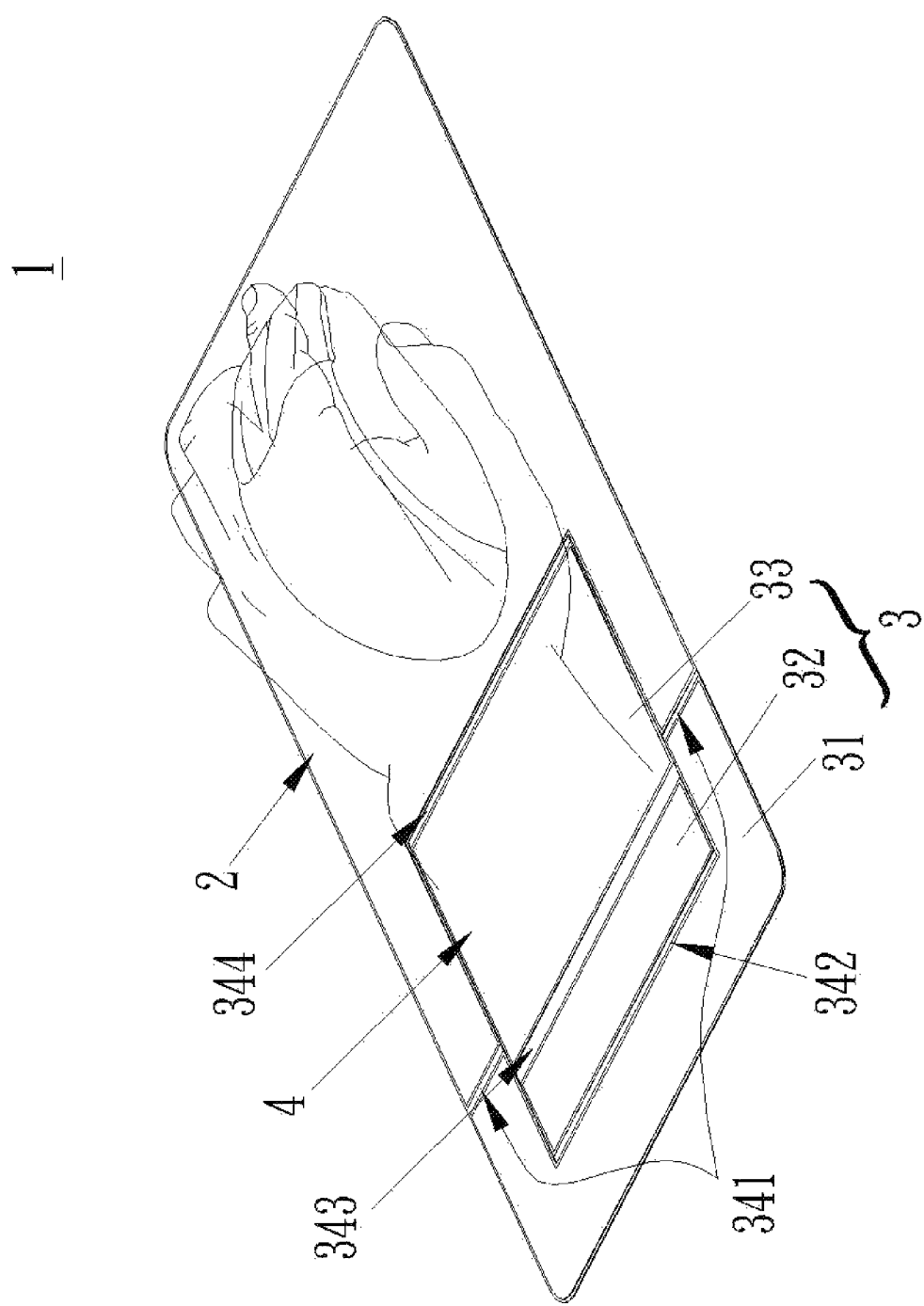
FIG. 2 is a schematic view showing a using status of the mouse pad in accordance with the first embodiment of the present invention.

With reference to FIGS. 1 and 2 for the perspective view of a mouse pad and the schematic view of a using status of the mouse pad in accordance with the first embodiment of the present invention respectively, the mouse pad 1 comprises a mouse pad body 2 and a mobile device support area 3, wherein the mouse pad body 2 and the mobile device support area 3 before its transformation can be used as a mouse pad for operating a mouse. The mouse pad 1 further comprises a wrist rest portion 4 disposed in the mobile device support area 3 and extending from a side of the mouse pad body 2a. The wrist rest portion 4 is protruded from the top of the mouse pad body 2 and filled with liquid polymers, silicone, gas, or fiber therein for providing a comfortable support to a user's wrist.

Figure 3:
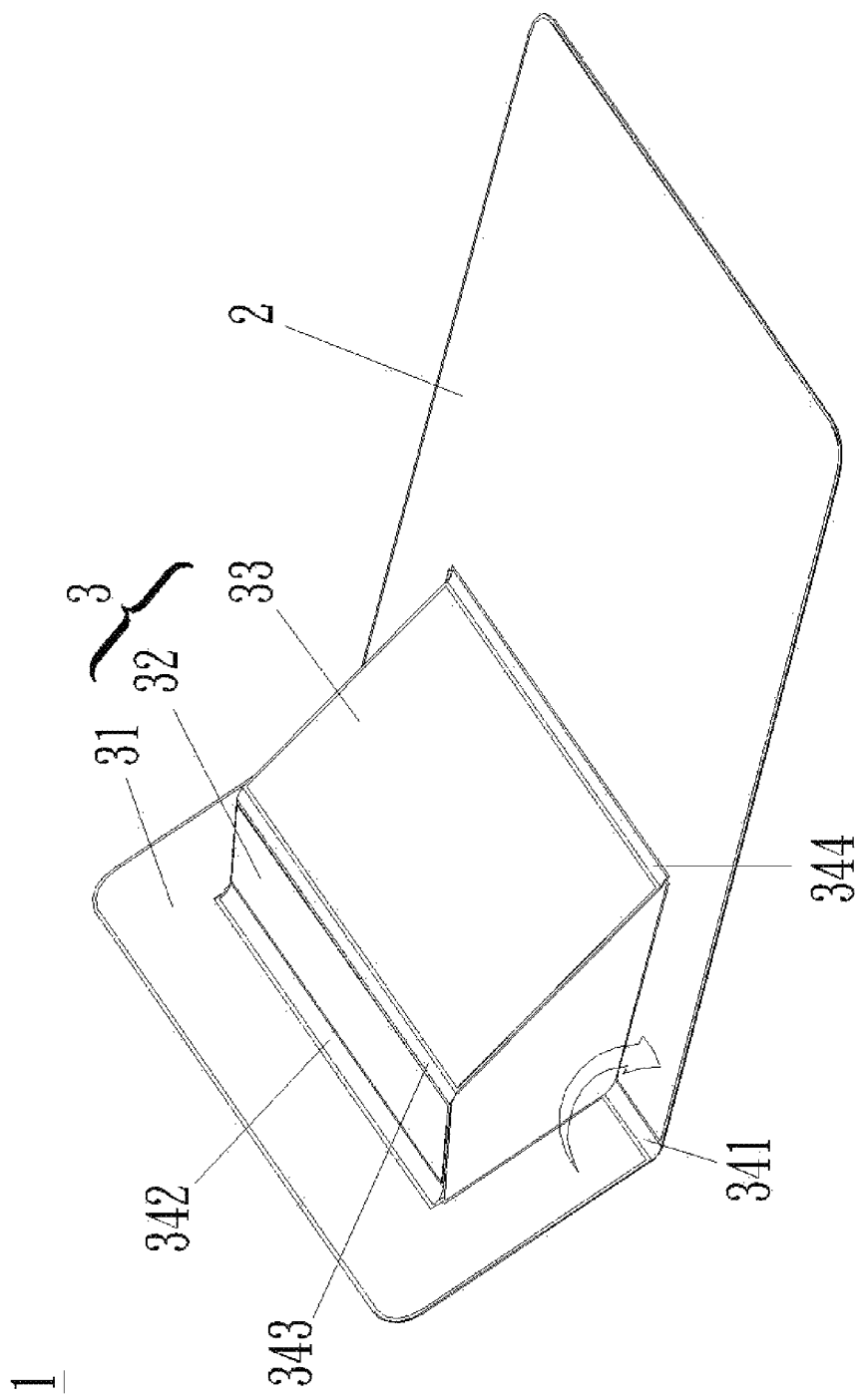
FIG. 3 is a schematic view of a part of a mouse pad transformed the into a mobile device support stand in accordance with a second embodiment of the present invention.
Figure 4:
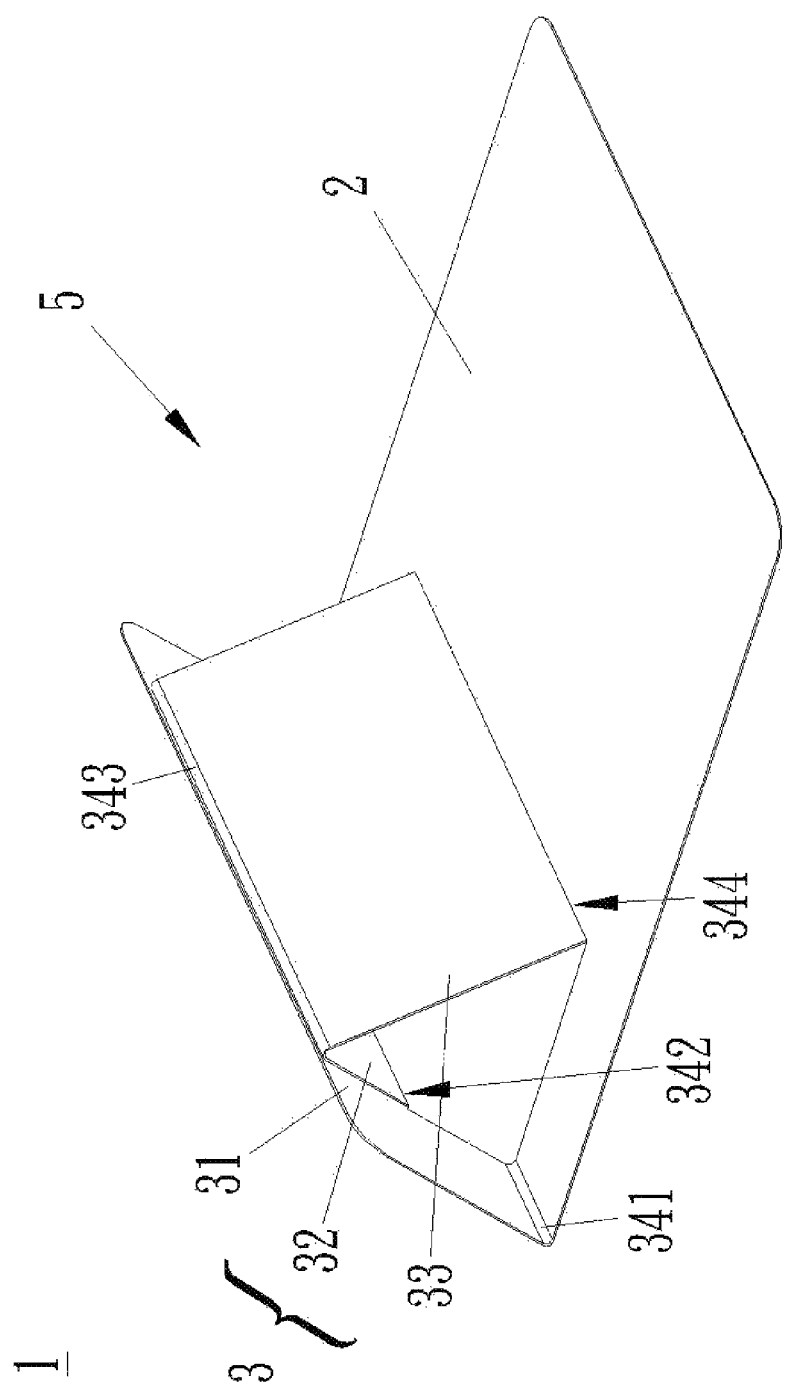
FIG. 4 is a perspective view of the transformed mobile device support stand in accordance with the second embodiment of the present invention.
Figure 5:
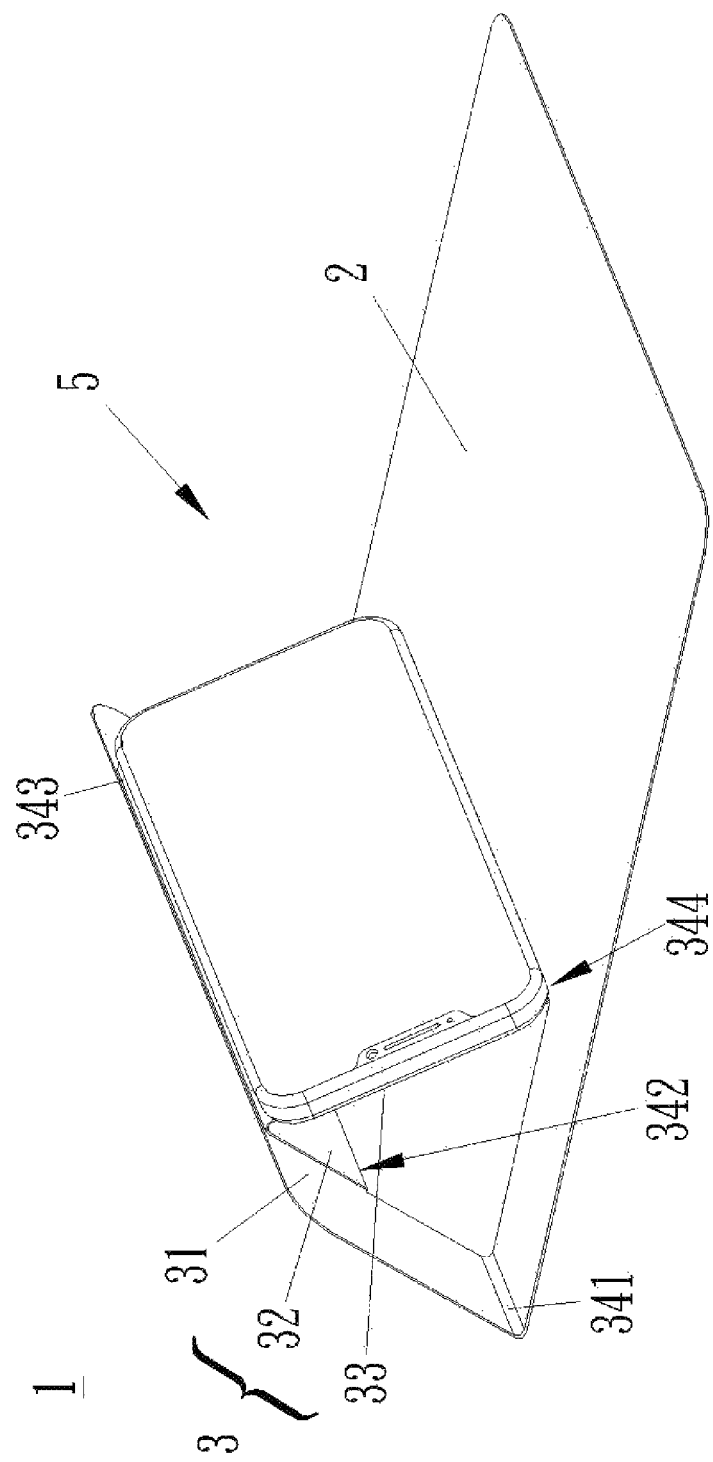
FIG. 5 is a schematic view showing a using status of the transformed mobile device support stand in accordance with the second embodiment of the present invention.
Figure 6:
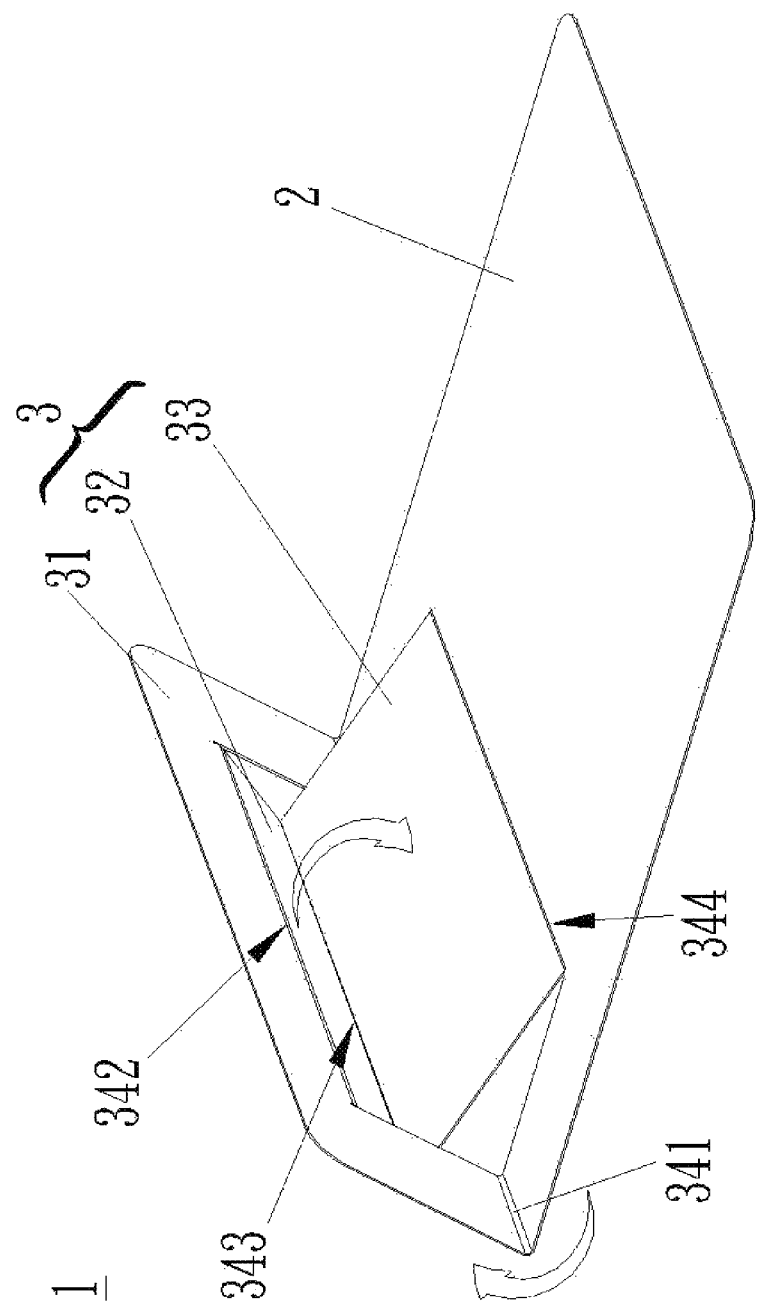
FIG. 6 is a schematic view of a part of a mouse pad transformed into a mobile device support stand in accordance with a third embodiment of the present invention.
Figure 7:
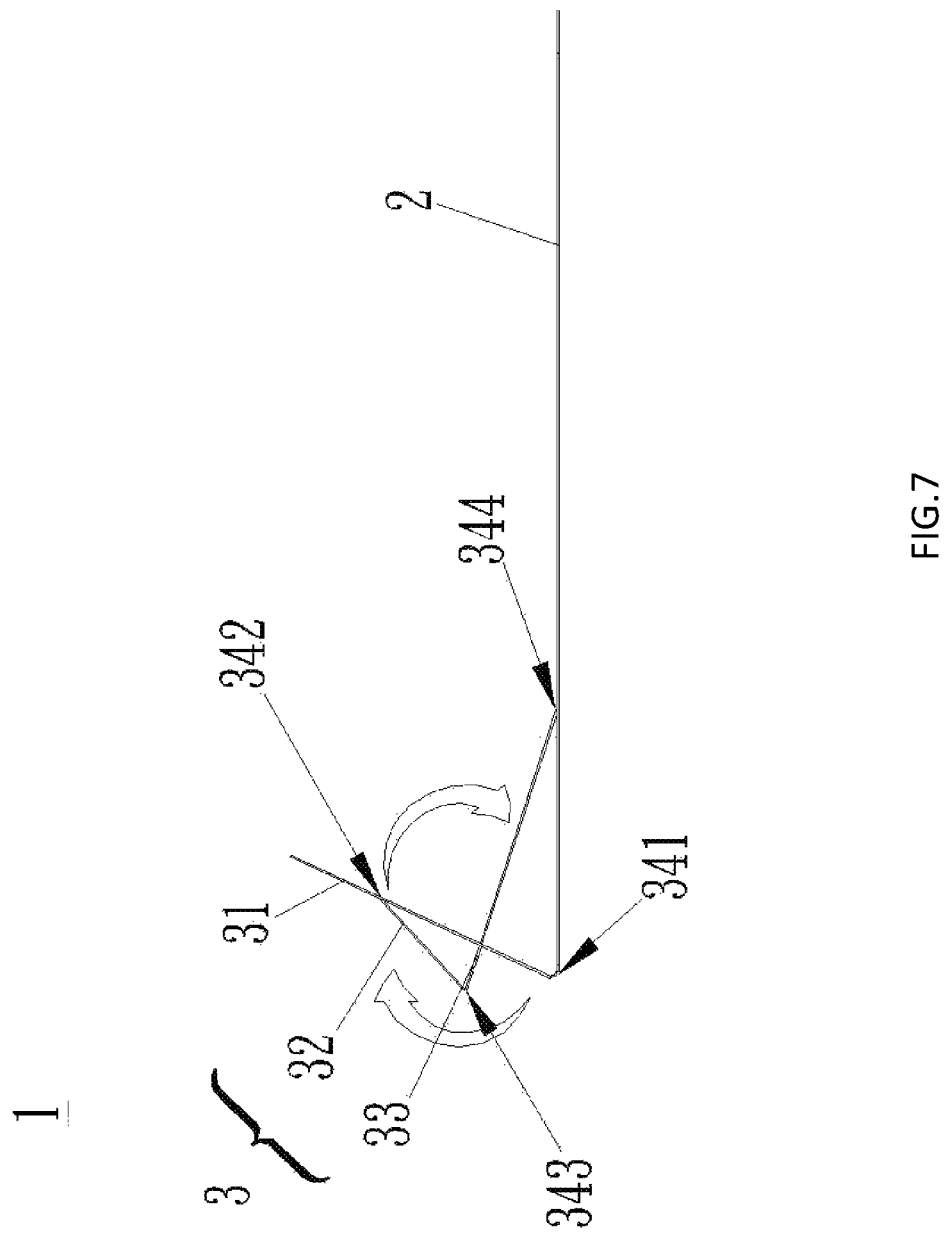
FIG. 7 is a side view of a part of the mouse pad transformed into the mobile device support stand in accordance with the third embodiment of the present invention.
Figure 8:
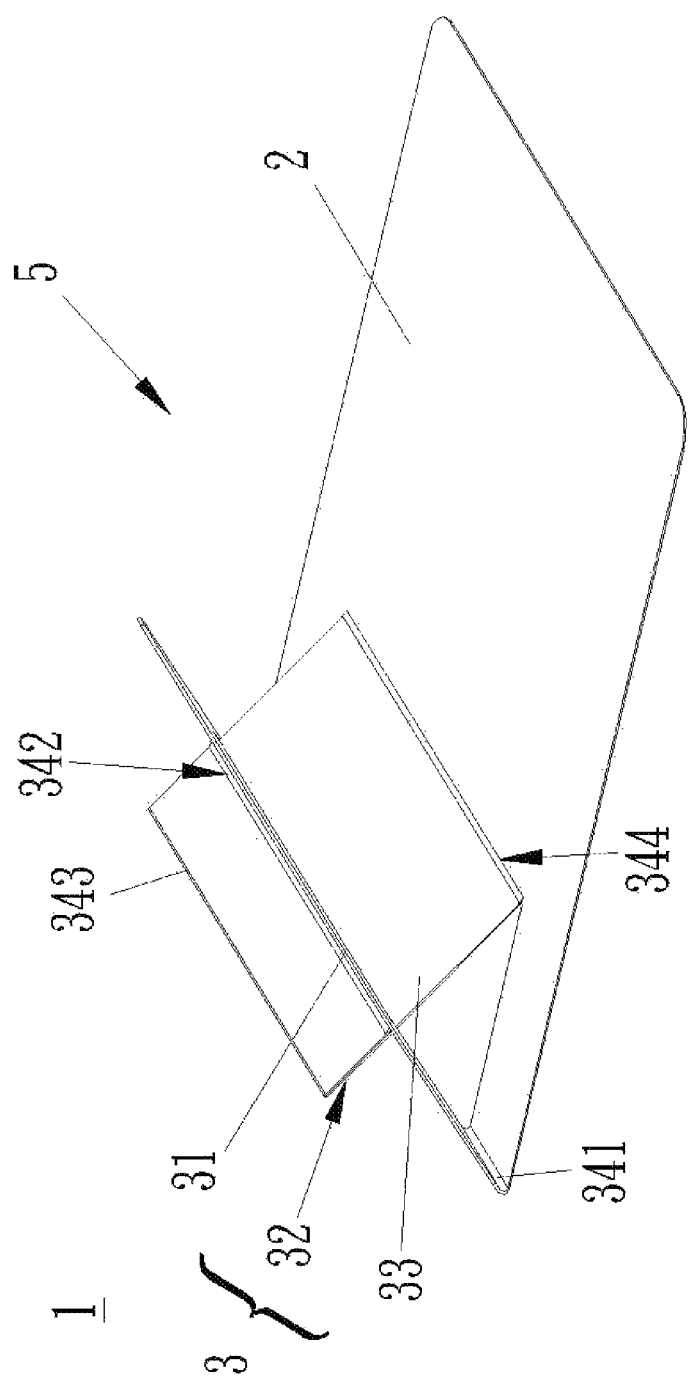
FIG. 8 is a perspective view of the transformed mobile device support stand in accordance with the third embodiment of the present invention.
Figure 9:
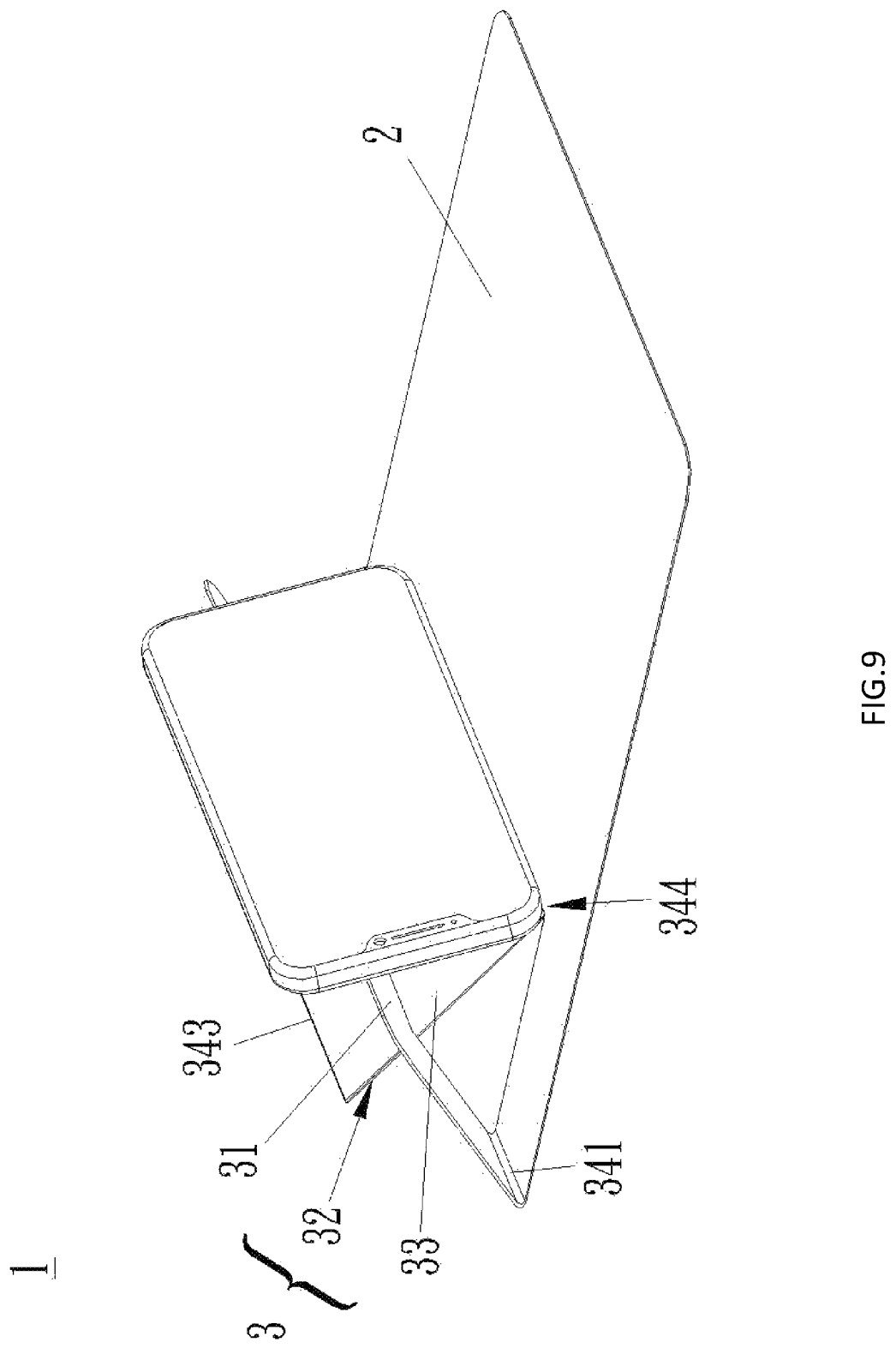
FIG. 9 is a schematic view showing a using status of the transformed mobile device support stand in accordance with the third embodiment of the present invention.

With reference to FIGS. 3 to 5 for the schematic view of the perspective view of the mobile device support area transformed into a mobile device support stand and a schematic view of a using status of the transformed mobile device support stand in accordance with the second embodiment of the present invention respectively, the mouse pad 1 comprises a mouse pad body 2 and a mobile device support area 3, wherein the mobile device support area 3 extends from a side of the mouse pad body 2, and the mobile device support area 3 can be turned clockwise, so that the mobile device support area 3 sticks out in a direction towards the top of the mouse pad body 2 to transform into a mobile device support stand 5, so that users can use the transformed mobile device support stand 5 (as shown in FIGS. 3, 4, 7 and 8), or can use the mouse pad body 2 for the operation of a mouse while using the transformed mobile device support stand 5 (as shown in FIGS. 3, 4, 7 and 8) to achieve the effect of watching a mobile device.

The mobile device support area 3 sequentially comprises a flip plate 31, a bonded plate 32 and a plate member 33, wherein the flip plate 31 and the mouse pad body 2 have a first longitudinal bent portion 341 therebetween; the flip plate 31 and the bonded plate 32 have a second longitudinal bent portion 342 therebetween; the bonded plate 32 and the plate member 33 have a third longitudinal bent portion 343 therebetween; and the plate member 33 and the mouse pad body 2 have a fourth longitudinal bent portion 344 therebetween. The longitudinal bent portions are flexible concave portions that provide bending spaces. The flip plate 31 can be turned clockwise until the bonded plate 32 is attached to the flip plate 31, and the bonded plate 32 and the plate member 33 stick out to drive the plate member 33 to incline for approximately 20 degrees from the top of the mouse pad body 2 to abut an external mobile device, and the mobile device support area 3 is substantially a triangular prism. Therefore, a user can use the transformed mobile device support stand 5, or can use the mouse pad body 2 for the operation of a mouse while using the transformed mobile device support stand 5 to achieve the effect of watching the mobile device.

The flip plate 31, the bonded plate 32 and the plate member 33 in the mobile device support area 3 have magnets, Velcro tapes, or snap members for connecting one another securely. In this embodiment, a part of the bonded plate 32 and a part of the flip plate 31 have magnets therein for coupling the bonded plate 32 with the flip plate 31 securely.

In addition, the flat mouse pad 1 of the first embodiment is turned upside down, and turned and bent according to this embodiment to achieve the effect of sticking out the bonded plate 32 and the plate member 33, so as to drive the plate member 33 to incline from the top of the mouse pad body 2 and abut an external mobile device, wherein the mobile device support area 3 is substantially a triangular prism.

With reference to FIGS. 6 to 9 for the schematic view and the side view of a part of a mouse pad transformed into a mobile device support stand, the perspective view of the transformed mobile device support stand, and the schematic view of a using status of the transformed mobile device support stand in accordance with a third embodiment of the present invention respectively, the mobile device support area 3 sequentially comprises a flip plate 31, a bonded plate 32 and a plate member 33, wherein the flip plate 31 and the mouse pad body 2 have a first longitudinal bent portion 341 therebetween; the flip plate 31 and the bonded plate 32 have a second longitudinal bent portion 342 therebetween; the bonded plate 32 and the plate member 33 have a third longitudinal bent portion 343 therebetween; and the plate member 33 and the mouse pad body 2 have a fourth longitudinal bent portion 344 therebetween. These longitudinal bent portions are flexible concave portions for providing bending spaces. The flip plate 31 can be turned clockwise to drive the bonded plate 32 and the plate member 33 to fold until the bonded plate 32 is attached to the plate member 33, so as to drive the flip plate 31 to incline for approximately 15 degrees from the top of the mouse pad, so that the periphery of the flip plate 31 abuts an external mobile device, wherein the mobile device support area 3 is substantially a cross-shaped support stand.

The flip plate 31, the bonded plate 32 and the plate member 33 in the mobile device support area 3 have magnets, Velcro tapes, or snap members for connecting one another securely. In this embodiment, a part of the bonded plate 32 and a part of the plate member 33 have magnets for connecting the bonded plate 32 with the plate member 33 securely.

In addition, the flat mouse pad 1 of the first embodiment is turned upside down, and turned and bent according to this embodiment to achieve the effect of driving the flip plate 3 to incline from the top of the mouse pad body 2, so that the periphery of the flip plate 3 abuts an external mobile device, wherein the mobile device support area 3 is substantially a cross-shaped support stand.

Figure 10:
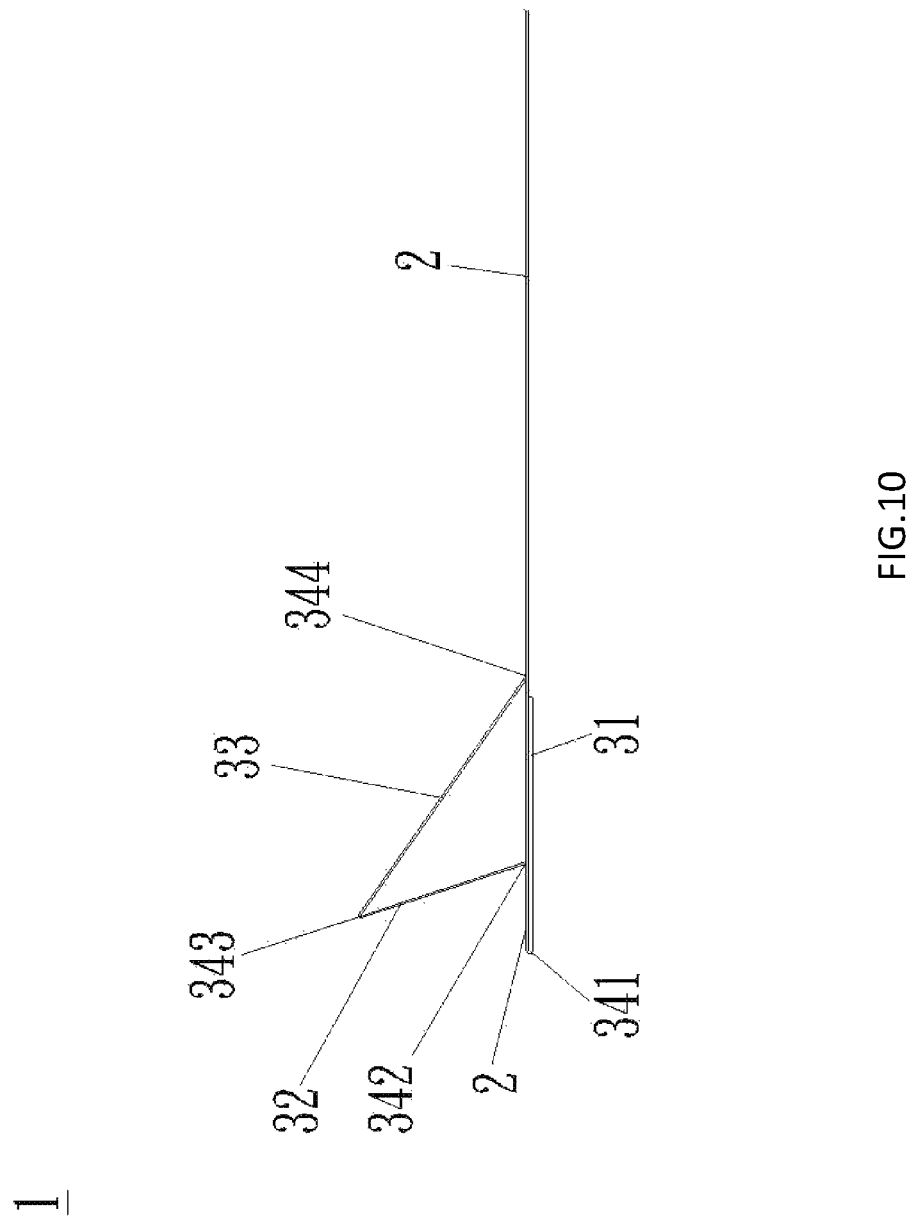
FIG. 10 is a side view of a part of a mouse pad transformed into a mobile device support stand in accordance with a fourth embodiment of the present invention.

With reference to FIG. 10 for a side view of a part of a mouse pad transformed into a mobile device support stand in accordance with a fourth embodiment of the present invention, the mobile device support area 3 sequentially comprises a flip plate 31, a bonded plate 32 and a plate member 33, wherein the flip plate 31 and mouse pad body 2 have a first longitudinal bent portion 341 therebetween; the flip plate 31 and the bonded plate 32 have a second longitudinal bent portion 342 therebetween; the bonded plate 32 and the plate member 33 have a third longitudinal bent portion 343 therebetween; and the plate member 33 and the mouse pad body 2 have a fourth longitudinal bent portion 344 therebetween. These longitudinal bent portions are flexible concave portions for providing bending spaces. The flip plate 31 can be turned counterclockwise until the flip plate 31 is attached to a part of the mouse pad body 2 (or both left and right sides of the mouse pad body 2), so that the bonded plate 32 and the plate member 33 stick out to drive the plate member 33 to incline for approximately 10 degrees from the top of the mouse pad and abut an external mobile device, wherein the mobile device support area 3 is substantially a triangular prism. Users can use the mouse pad or the transformed mobile device support stand alone or use the mouse pad body 2 for the operation of a mouse while using the transformed mobile device support stand to achieve the effect of watching a mobile device.

The flip plate 31, the bonded plate 32 and the plate member 33 in the mobile device support area 3 have magnets, Velcro tapes, or snap members for connecting one another securely. In this embodiment, the mouse pad body 2 and the flip plate 31 have magnets therein, so that the mouse pad body 2 and the flip plate 31 can be coupled to each other securely.

In addition, the flat mouse pad 1 of the first embodiment is turned upside down, and turned and bent according to this embodiment to achieve the effect of sticking out the bonded plate 32 and the plate member 33, so as to drive the plate member 33 to incline from the top of the mouse pad body 2 and abut an external mobile device, wherein the mobile device support area 3 is substantially a triangular prism.

What is claimed is:

1. A mouse pad comprising:
   a mouse pad body; and
   a mobile device support area, extending from a side of the mouse pad body, and turning clockwise to stick out towards the top of the mouse pad body and transform into a mobile device support stand,
   wherein the mobile device support area sequentially comprises a flip plate, a bonded plate and a plate member, and the flip plate can be folded, so that the bonded plate and the plate member are folded until the bonded plate is attached to the plate member, and the flip plate at the top of the mouse pad is inclined, so that the periphery of the flip plate abuts an external mobile device, and the mobile device support area is a cross-shaped support stand in a cross-section view, wherein the flip plate and the mouse pad body have a first longitudinal bent portion therebetween; the flip plate and the bonded plate have a second longitudinal bent portion therebetween;
   the bonded plate and the plate member have a third longitudinal bent portion therebetween; and the plate member and the mouse pad body have a fourth longitudinal bent portion therebetween; and a bulging wrist rest portion extending from a side of the mouse pad body.

2. The mouse pad as claimed in claim 1, wherein the flip plate can be turned clockwise folded until the bonded plate is attached to the flip plate, and the bonded plate and the plate member stick out, so that the plate member is inclined from the top of the mouse pad to abut an external mobile device, and the mobile device support area is a triangular prism.

3. The mouse pad as claimed in claim 2, wherein the flip plate and the mouse pad body have a first longitudinal bent portion therebetween; the flip plate and the bonded plate have a second longitudinal bent portion therebetween; the bonded plate and the plate member have a third longitudinal bent portion therebetween; and the plate member and the mouse pad body have a fourth longitudinal bent portion therebetween.

4. The mouse pad as claimed in claim 3, wherein the longitudinal bent portions are flexible concave portions.

5. The mouse pad as claimed in claim 1, wherein the flip plate can be turned folded until the flip plate is attached to a part of the mouse pad body, so that the bonded plate and the plate member stick out to drive the plate member to incline from the top of the mouse pad and abut an external mobile device, and the mobile device support area is a triangular prism.

6. The mouse pad as claimed in claim 5, wherein the flip plate and the mouse pad body have a first longitudinal bent portion therebetween; the flip plate and the bonded plate have a second longitudinal bent portion therebetween; the bonded plate and the plate member have a third longitudinal bent portion therebetween; and the plate member and the mouse pad body have a fourth longitudinal bent portion therebetween.

7. The mouse pad as claimed in claim 1, wherein the mobile device support area is a magnet.

* * * * *